Aug. 30, 1955    E. W. LANGE    2,716,264
CLOTHESLINE CLAMP
Filed July 16, 1952
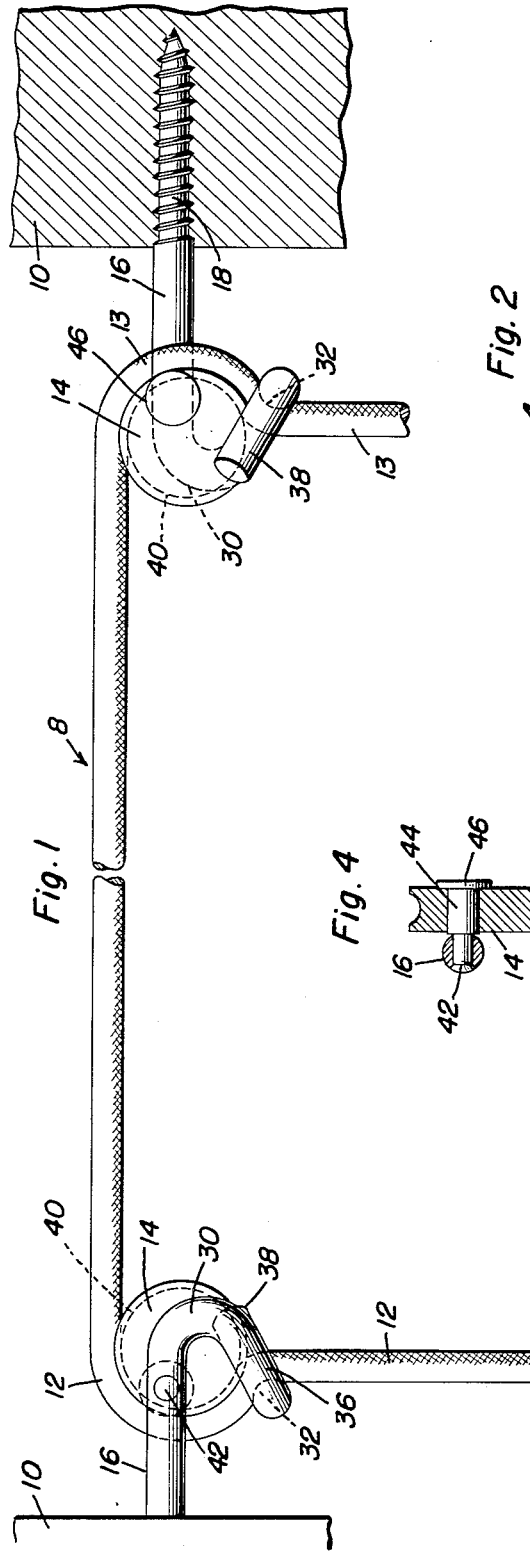
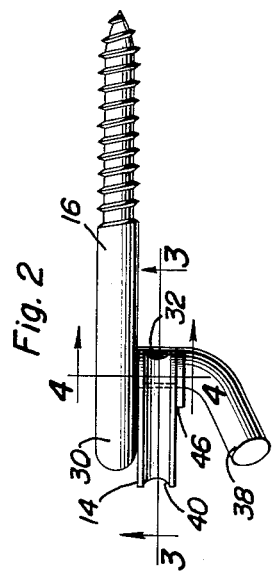
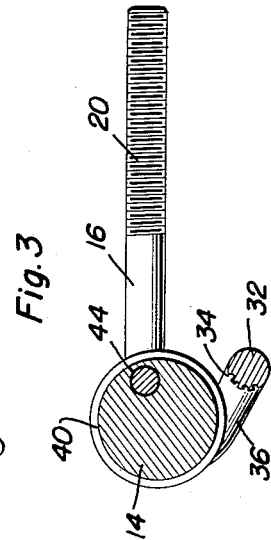
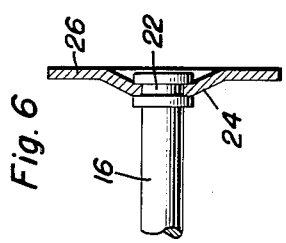
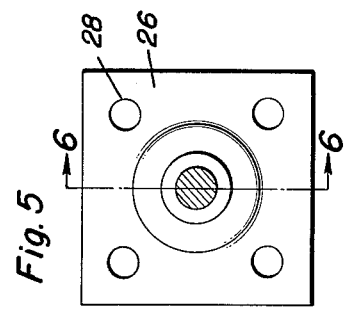
Erwin W. Lange
INVENTOR.

United States Patent Office 2,716,264
Patented Aug. 30, 1955

2,716,264

CLOTHESLINE CLAMP

Erwin W. Lange, Kenosha, Wis.

Application July 16, 1952, Serial No. 299,132

2 Claims. (Cl. 24—134)

The present invention relates to rope clamps, generally speaking, and has more particular reference to a device which is especially adapted to accommodate an end of a clothesline rope wherein said device is characterized by a pulley, and means for attaching the pulley to a post or equivalent support, said means being unique in that it is provided with a member cooperating with the peripheral portion of the pulley so that the latter becomes a cam and serves to lockingly bind the rope against said member.

More specifically, the invention is characterized by a hook on a shank with means at one end of the shank for screwing or otherwise attaching the same to a support post and extra facilities being provided on and carried by the opposite end portion of the shank to accommodate the eccentrically pivoted pulley in a manner to thus provide a simple and practical rope clamp, one in which the free end of the rope may be manipulated in such a manner as to readily lift and swing the pulley upwardly on its pivot and to in this manner release the rope for loosening or tautening as the case may be.

Briefly summarized, a preferred structural adaptation of the invention has to do with a shank having a rope clamp comprising a shank having means at one end for attachment to a fixed support, a pulley superimposed on and eccentrically pivoted to said shank, said pulley functioning as a rope clamping cam, and a rope seating and binding member secured to said shank, disposed at right angles to said shank, being approximately parallel to the axis of said pivot and spanning the peripheral portion of said pulley.

The aforementioned rope seating member is further unique in that it is milled or otherwise roughened to provide anti-slipping teeth.

Then, too, novelty is predicated on the structural features mentioned in conjunction with a terminal finger which is oblique to the member and which is opposed to and located in close proximity to an adjacent side of the pulley to thus function as a convenient keeper or holder for the free end of the rope.

Other objects, features and advantages will become more readily apparent from the following description and the accompanying sheet of illustrative drawings.

In the drawings:

Figure 1 is an elevational view showing two of the pulley-equipped rope clamps constructed in accordance with the principles of the present invention and showing how these devices appear from opposite sides and also how they are used;

Figure 2 is a top plan view of the device seen at the right in Figure 1 with the rope removed;

Figure 3 is a section on the horizontal line 3—3 of Figure 2 looking in the direction of the arrows;

Figure 4 is a view at right angles taken on the line 4—4 of Figure 2 looking in the direction of the arrows;

Figure 5 is a view of a modification showing a different mode of fastening one end of the shank said view observing Figure 6 in a direction from left to right; and, Figure 6 is a section on the line 6—6 of Figure 5 looking in the direction of the arrows.

In Figure 1 the clothesline which as here shown is in the form of a rope or an equivalent of flexible element and is denoted by the numeral 8. The ends are to be adjustably attached to the respective supports or other posts 10—10 by way of pulleys, pulleys which include satisfactory attaching means and also means for clamping the free end portions 12 and 13 of the rope in set positions. Although the observer sees two such devices in Figure 1 and while they are shown as they appear from opposite sides it will be evident that each device is the same in construction and therefore a description of one will suffice for all. To this end, the device is essentially characterized by a unit for attaching the pulley 14 to the post. This unit is in turn characterized by a linearly straight rigid shank 16 one end of which is suitably constructed for attachment to the post. The end 18, seen in Figure 1, is a simple wood screw, and this also appears in Figure 2. A different form of screw which may be used to accommodate a clamping nut is shown at 20 in Figure 3. In the modifications, seen in Figures 5 and 6, the shank 16 is provided with flanges at one end defining a head 22 engageable with an apertured portion in a concavo-convex extrusion 24 in the attaching plate 26. The latter is apertured at 28 so that it may be bolted, screwed or otherwise fastened to a support post. This disposes of the several ways in which one end of the shank 16 may be constructed for attachment to support means.

The opposite end of the shank in all instances is the same in construction throughout the views. Actually one may treat the shank as a so-called hook-screw. In any event the left-hand end of the shank in Figures 1, 2 and 3 is formed into a conventional type hook 30. The bill portion of the hook instead of terminating, as is usual in hook construction, is provided with extension means. The extension means comprises an integral right-angularly disposed rope seating member 32. This is generally cylindrical in cross-section as shown in Figure 3 and one surface thereof is provided with anti-slipping teeth 34 for more satisfactorily gripping the rope which is bound against the same. Incidentally, the bill portion of the hook already mentioned is thus shown in Figure 3 where it is denoted by the numeral 36. The remainder of the extension takes the form of what may be conveniently called a rope piloting and guard finger and this is denoted by the numeral 38 and it is somewhat oblique to the surface of the pulley 14 with which it is cooperable. The pulley is provided with a groove 40 and it is eccentrically pivoted so that it is superimposed on the shank and hook portions as shown best in Figures 1 and 3. A rivet is used as the pivot as shown in Figure 4 and this rivet is denoted by the numeral 42 and it has a smooth shank portion 44 which provides the pivot for the pulley and then there is a retaining head at 46 which keeps the pulley in place. It will be seen that the pulley therefore, when it is in the vertical position as seen in Figure 1, has an up and down swinging movement. When it is "down" under the forces of gravity it swings between the hook or bill portion 36 and guard finger 38 where it thus clampingly engages and binds the free end of the rope against the anvil-like member 32 in order to thus fasten the free end of the rope in place and against slippage. The free end of the rope is guarded against accidental displacement by the keeper or guard finger 38, as is obvious. This finger also assists one in catching hold of the free end 13 and giving it an upward yank and in this manner to also swing the pulley up on its pivot and to temporarily release the clamping action between the pulley and the anvil member 32.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

1. A rope clamp comprising a linearly straight shank cylindrical in cross-section and having means whereby one end is attachable to a fixed support and having a return bend at its opposite end underlying said latter end of the shank and providing a hook, said hook including a bill portion and said bill portion being coplanar with said shank and having a lateral extension, said extension projecting at right angles beyond the plane of the hook and shank portions and having an oblique-angled terminal, said terminal being directed toward said turn bend and being in a position in spaced relation to said bill portion and constituting a guard finger, a pulley located in the space between the hook and guard finger and superimposed against and eccentrically pivoted on the intermediate portion of said shank in a plane directly above the plane of said extension, the peripheral portion of said pulley being swingable in an arc toward and from said lateral extension.

2. The structure defined in claim 1 wherein said extension is provided with anti-slipping teeth, is joined with the terminal end of the bill portion of the hook, extends across the adjacent peripheral portion of said pulley, and wherein said pulley is normally confined for operation in the space between said guard finger and said hook.

References Cited in the file of this patent

UNITED STATES PATENTS

| | | |
|---|---|---|
| 69,767 | Chase | Oct. 15, 1867 |
| 457,276 | Haven | Aug. 4, 1891 |
| 557,800 | Gray | Apr. 7, 1896 |
| 566,404 | Lougee | Aug. 25, 1896 |
| 746,135 | Obiols | Dec. 8, 1903 |
| 881,662 | Carey | Mar. 10, 1908 |
| 1,190,467 | Schnelle | July 11, 1916 |
| 2,485,872 | Fisher | Oct. 25, 1949 |